(12) United States Patent
Caywood et al.

(10) Patent No.: US 10,668,604 B2
(45) Date of Patent: Jun. 2, 2020

(54) NON-DESTRUCTIVE COLD EXTRACTIONS OF PRESS FIT BUSHINGS

(71) Applicant: SIKORSKY AIRCRAFT CORPORATION, Stratford, CT (US)

(72) Inventors: David W. Caywood, Avon, CT (US); Timothy James Conti, Shelton, CT (US)

(73) Assignee: SIKORSKY AIRCRAFT CORPORATION, Stratford, CT (US)

( * ) Notice: Subject to any disclaimer, the term of this patent is extended or adjusted under 35 U.S.C. 154(b) by 336 days.

(21) Appl. No.: 15/516,740

(22) PCT Filed: Oct. 7, 2015

(86) PCT No.: PCT/US2015/054413
§ 371 (c)(1),
(2) Date: Apr. 4, 2017

(87) PCT Pub. No.: WO2016/060906
PCT Pub. Date: Apr. 21, 2016

(65) Prior Publication Data
US 2017/0297185 A1    Oct. 19, 2017

Related U.S. Application Data

(60) Provisional application No. 62/060,671, filed on Oct. 7, 2014.

(51) Int. Cl.
*B23P 19/00* (2006.01)
*B25B 27/06* (2006.01)
(Continued)

(52) U.S. Cl.
CPC ............ *B25B 27/062* (2013.01); *B64C 27/06* (2013.01); *B64F 5/40* (2017.01)

(58) Field of Classification Search
CPC ......... B25B 27/062; B64C 27/06; B64F 5/40; B23P 11/00; B23P 19/00; B23P 19/02; B23P 19/06
See application file for complete search history.

(56) References Cited

U.S. PATENT DOCUMENTS 1,496,451 A    6/1924   Canfield et al.
2,859,456 A    11/1958  Taylor
(Continued)

OTHER PUBLICATIONS

Notification of Transmittal of the International Search Report for International Application No. PCT/US15/54413 dated Feb. 29, 2016; dated Mar. 28, 2016; 11 pages.
(Continued)

*Primary Examiner* — Lee D Wilson
(74) *Attorney, Agent, or Firm* — Cantor Colburn LLP

(57) ABSTRACT

An assembly for removing a bushing is provided including a mandrel having a size and shape similar to the bushing and a receiver having a hollow interior cavity. A fastener extends through an opening formed in both the mandrel and the receiver. A socket attachment has a first opening configured to removably couple to a first end of the fastener and a second opening configured to removably couple to a torque delivery tool. A biasing mechanism arranged adjacent a second end of the fastener is configured to generate a biasing force to drive the mandrel against a bushing in response to a coupling of the socket attachment and the fastener.

9 Claims, 5 Drawing Sheets

(51) Int. Cl.
*B64F 5/40* (2017.01)
*B64C 27/06* (2006.01)

(56) References Cited

U.S. PATENT DOCUMENTS

| | | | |
|---|---|---|---|
| 4,694,569 A | | 9/1987 | Colvell et al. |
| 4,724,608 A | * | 2/1988 | Parrott .................. B25B 27/023 29/253 |
| 5,848,460 A | | 12/1998 | Rasmussen et al. |
| 5,896,639 A | * | 4/1999 | Chen ...................... B25B 27/026 29/261 |
| 6,158,110 A | | 12/2000 | Takacs |
| 6,282,806 B1 | * | 9/2001 | Kable .................... B23Q 3/183 33/520 |
| 2004/0187284 A1 | * | 9/2004 | Draggie .................. B21J 15/50 29/263 |
| 2012/0036691 A1 | | 2/2012 | Mueller |
| 2016/0271775 A1 | * | 9/2016 | Hohmann ............... B25B 29/02 |
| 2017/0297185 A1 | * | 10/2017 | Caywood ............. B25B 27/062 |

OTHER PUBLICATIONS

Written Opinion of the International Searching Authority for International Application No. PCT/US15/54413 dated Feb. 29, 2016; dated Mar. 28, 2016; 5 pages.
PCT International Preliminary Report on Patentability for International Application No. PCT/US2015/054413; International filing date: Oct. 7, 2015; dated Apr. 11, 2017; 6 pgs.

* cited by examiner

NON-DESTRUCTIVE COLD EXTRACTIONS OF PRESS FIT BUSHINGS

CROSS REFERENCE TO RELATED APPLICATIONS

This application is a National Stage application of PCT/US2015/054413, filed Oct. 7, 2015, which claims the benefit of U.S. Provisional Application No. 62/060,671, filed Oct. 7, 2014, both of which are incorporated by reference in their entirety herein.

BACKGROUND OF THE INVENTION

Exemplary embodiments of the invention relate to bushing assemblies, and more particularly, to a method of removing a bushing assembly from a joint, such as from a clevis type joints, for example in the main rotor cuff of a rotary wing aircraft.

Clevis type joints, such as used in a rotor blade cuff for example, are commonly used to transfer a load from one structural member to another by a bolt of pin. It may be desirable to bush these clevis joints to provide protection against damage to the laminated structure which might occur such as during bolt installation and/or removal, or due to normal wear. In joints where the loads are transmitted in a direction parallel to the bolt axis, it is frequently desirable to incorporate should bushings, which can provide protection for the adjacent surfaces of the joint.

Bushings are currently removed from a rotor blade cuff using a series of washers that damage the cuff, such as by causing surface delaminations in the structural material of the cuff. As a result of this damage, the rotor blade cuff is ultimately scrapped, resulting in significant waste of both materials and money.

Accordingly, it is desirable to develop a tool and a method of using the tool for removing bushings without damaging the surrounding structure.

BRIEF DESCRIPTION OF THE INVENTION

According to one embodiment of the invention, an assembly for removing a bushing is provided including a mandrel having a size and shape similar to the bushing and a receiver having a hollow interior cavity. A fastener extends through an opening formed in both the mandrel and the receiver. A socket attachment has a first opening configured to removably couple to a first end of the fastener and a second opening configured to removably couple to a torque delivery tool. A biasing mechanism arranged adjacent a second end of the fastener is configured to generate a biasing force to drive the mandrel against a bushing in response to a coupling of the socket attachment and the fastener.

In addition to one or more of the features described above, or as an alternative, in further embodiments the mandrel includes at least one chamfer configured to ensure proper engagement with the bushing.

In addition to one or more of the features described above, or as an alternative, in further embodiments the first end of the fastener includes a plurality of first threads and the first opening of the socket attachment includes a plurality of second threads. The first threads are complementary to the second threads.

In addition to one or more of the features described above, or as an alternative, in further embodiments the biasing mechanism comprises a coil spring.

In addition to one or more of the features described above, or as an alternative, in further embodiments the biasing mechanism is positioned between a portion of the fastener and the mandrel.

In addition to one or more of the features described above, or as an alternative, in further embodiments the biasing mechanism is positioned between a portion of the fastener and the receiver.

According to another embodiment of the invention, a socket attachment is provided including a body having a first opening extending inwardly from a first end of the body. A second opening extends inwardly from a second, opposite end of the body. The first opening is configured to couple the socket attachment to threads of a fastener. The second opening is configured to connect the socket attachment to a torque delivery tool.

In addition to one or more of the features described above, or as an alternative, in further embodiments the first opening includes a plurality of threads complementary to a portion of the fastener.

In addition to one or more of the features described above, or as an alternative, in further embodiments the second opening differs in at least one of size and shape from the first opening.

In addition to one or more of the features described above, or as an alternative, in further embodiments the torque delivery tool is a wrench.

In addition to one or more of the features described above, or as an alternative, in further embodiments the torque delivery tool is a socket wrench and the second opening is configured to receive a poste extending from a head of the socket wrench.

In addition to one or more of the features described above, or as an alternative, in further embodiments a mandrel is arranged adjacent a bushing. The mandrel has a size and shape similar to the bushing. A receiver has a hollow interior cavity. A fastener extends through an opening formed in the mandrel and the receiver. The socket attachment is coupled to a first end of the fastener. A biasing mechanism is arranged adjacent an end of the fastener. The biasing mechanism is configured to generate a biasing force to drive the mandrel against the bushing in response to coupling the socket attachment to the fastener.

According to yet another embodiment of the invention, a method of removing a bushing is provided including installing an assembly. The assembly includes a mandrel and a receiver positioned on opposing sides of the bushing, a socket attachment, a biasing mechanism, and a fastener extending through the mandrel, bushing, biasing mechanism, and receiver. The fastener is coupled to the socket attachment. The mandrel is drive along an axis of the fastener into contact with the bushing. The bushing is captured within a hollow interior cavity of the receiver.

In addition to one or more of the features described above, or as an alternative, in further embodiments coupling the fastener to the socket attachment compresses the biasing mechanism.

In addition to one or more of the features described above, or as an alternative, in further embodiments a biasing force of the biasing mechanism drives the mandrel into contact with the bushing.

BRIEF DESCRIPTION OF THE DRAWINGS

The subject matter, which is regarded as the invention, is particularly pointed out and distinctly claimed in the claims at the conclusion of the specification. The foregoing and other features, and advantages of the invention are apparent from the following detailed description taken in conjunction with the accompanying drawings in which:

The detailed description explains embodiments of the invention, together with advantages and features, by way of example with reference to the drawings.

DETAILED DESCRIPTION OF THE INVENTION

Figure 1:
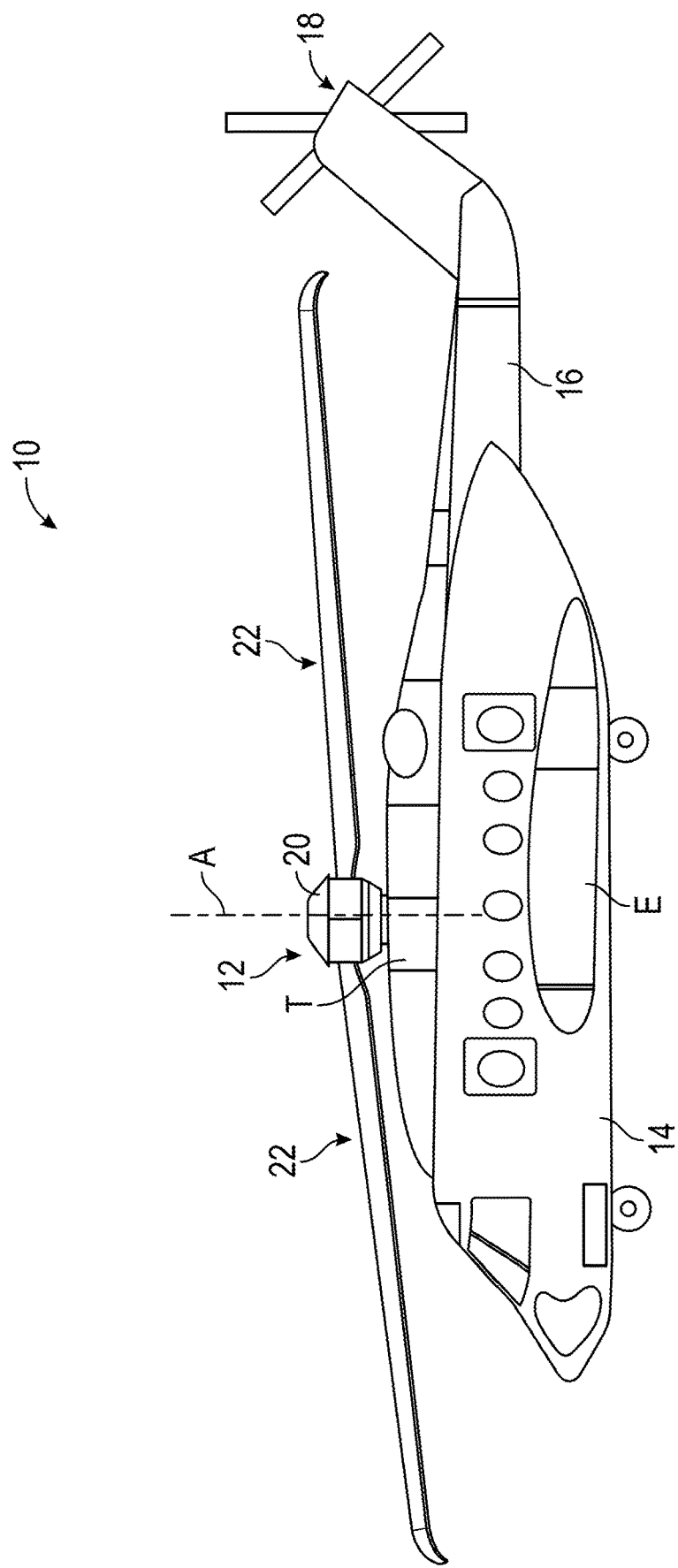
FIG. 1 is a side view of an exemplary rotary wing aircraft embodiment for use with the present invention.

FIG. 1 schematically illustrates an example of a rotary wing aircraft 10 having a main rotor assembly 12. The aircraft 10 includes an airframe 14 having an extending tail 16 which mounts a tail rotor system 18, such as an anti-torque system, a translational thrust system, a pusher propeller, a rotor propulsion system, and the like. The main rotor assembly 12 includes a plurality of rotor blade assemblies 22 mounted to a rotor hub 20 assembly. The main rotor assembly 12 is driven about an axis of rotation A through a main gearbox (illustrated schematically at T) by one or more engines E. Although a particular helicopter configuration is illustrated and described in the disclosed embodiment, other configurations and/or machines, such as high speed compound rotary wing aircrafts with supplemental translational thrust systems, dual contra-rotating, coaxial rotor system aircrafts, tilt-rotors and tilt-wing aircrafts, vertical takeoff and lift rotary wing aircrafts, and fixed wing aircrafts, will also benefit from embodiments of the invention.

Figure 2:
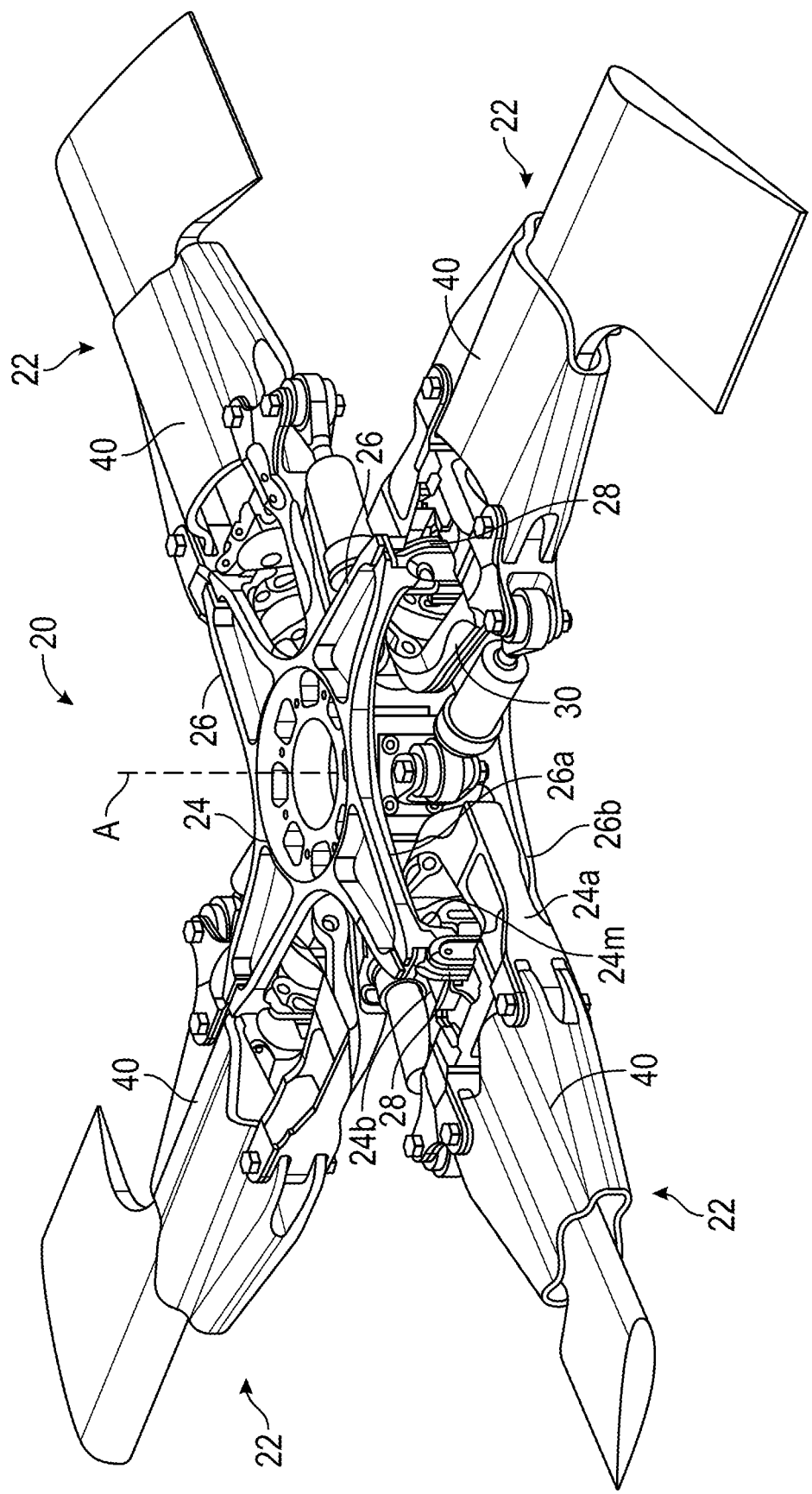
FIG. 2 is a perspective view of a rotor hub assembly of an aircraft according to an embodiment of the invention.
Figure 3:
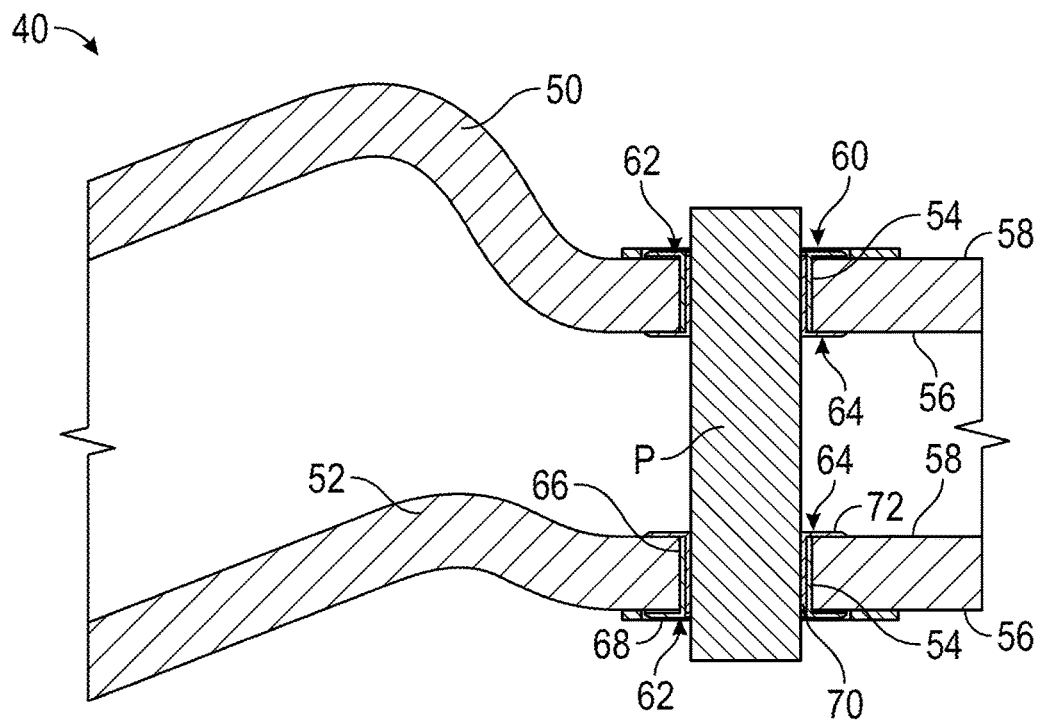
FIG. 3 is a cross-sectional view of an example of a yoke-receiving end of a composite cuff structure of a rotor blade assembly.

Referring now to FIG. 2, a rotor hub assembly 20 including a hub retention member 24 configured to drive the plurality of rotor blade assemblies 22 about an axis of rotation A is illustrated in more detail. The rotor hub 24 includes a plurality of radial spokes 26 and shear segments 28 which structurally interconnect pairs of radial spokes i.e. upper and lower radial spokes 26a, 26b, respectively. Each shear segment 28 in combination with its respective radial spoke 26, forms a structural loop for accepting a rotor assembly yoke 30. The rotor assembly yoke 30 is generally C-shaped and circumscribes, in a looped fashion, the respective shear segment 28. More specifically, the rotor assembly yoke 30 includes a midsection (not shown) which extends through the respective structural loop, and a pair of radial arms (not shown) which project outwardly from the midsection to either side of the shear segments 28. A composite cuff structure 40 attached to the root end of each rotor blade assembly 22 is disposed in combination with the radial arms of a rotor assembly yoke 30.

Referring now to FIGS. 3-7, the composite cuff structure 40 is generally tubular in shape and includes a blade receiving portion 46 adjacent a first end 42 and a yoke receiving portion 48 adjacent a second, opposite end 44. The yoke receiving portion 48 is defined by a substantially parallel first and second yoke mounting segments 50, 52 having axially aligned holes 54 drilled or otherwise formed therein. Each of the yoke mounting segments 50, 52 has an unloaded side 56 and a loaded side 58, and the aligned holes 54 are used for positioning a pin P or other fastener which couples the composite cuff structure 40 to the radial arms 34 of the rotor assembly yoke 30.

To protect the composite cuff structure 40 from damage due to the loading of the pins P, a bushing assembly 60 is positioned within the hole 54 of each yoke mounting segment 50, 52. As shown, the bushing assembly 60 is a shoulder bushing configured to protect not only the inside surface of the holes 54, but also the adjacent loaded and unloaded surfaces of the yoke mounting segments 50, 52 of the composite cuff structure 40. In the illustrated, non-limiting embodiment, the bushing assembly 60 includes a first bushing 62 and a second bushing 64. The first and second bushing 62, 64 may be formed from similar materials, or alternatively, may be formed from different materials, such as titanium and brass, respectively, for example.

The first bushing 62 has a substantially cylindrical portion 66 and a shoulder portion 68 which extends outwardly from the cylindrical portion 66 as shown in FIGS. 4-7. This first bushing 62 is sized and adapted to be positioned within holes 54 of the yoke mounting segments 50, 52. The second bushing 64 also has a substantially cylindrical portion 70 and a flange or shoulder 72 extending outwardly therefrom. The cylindrical portion 70 is adapted to fit, such as with a press-fit for example, within the cylindrical portion 66 of the first bushing 62.

Referring now to FIGS. 4-7, an assembly 80 for removing at least a portion of the bushing assembly 60 from within the hole 54 of the yoke mounting segments 50, 52 is illustrated in more detail. The assembly 80 includes a mandrel 82 having a size and shape generally complementary to the cylindrical portion 66, 70 of at least one of the bushings 62, 64. In one embodiment, features 86, such as chamfers or perpendicular cutouts with chamfered edges for example, formed in the end 84 of the mandrel 82 ensure proper engagement with the bushings 62, 64 and thereby prevent damage to the cuff structure 40 during removal of the bushings 62, 64.

The assembly 80 also includes a receiver 88 having a generally hollow cavity 90. The receiver 88 is generally positioned adjacent a surface of one of the yoke mounting segments 50, 52 such that the receiver 88 surrounds the flange 68, 72 of the bushing 62, 64 being removed therefrom. The receiver 88 is configured to retain the bushing 62, 64 within the hollow cavity 90 after being separated from the bushing assembly 60. While shown with a cavity 90, it is understood that other aspects of the invention do not require a cavity 90 which is closed where capture of the bushing 62, 64 is not required.

A fastener 92, such as a bolt for example, extends through a central opening 93 formed in the mandrel 82 and the receiver 88. A shaft 94 of the fastener 92 includes a threaded portion 96 arranged adjacent a first end 98 thereof. A second opposite end 100 of the fastener 92 may include a head 102 having a diameter larger than the diameter of the adjacent shaft 94. As shown in FIGS. 3-7, the second end 100 of the fastener 92 is generally positioned outside of the composite cuff structure 40, such as vertically above yoke mounting segment 50 for example. A biasing mechanism 104, such as a coil spring for example, is arranged between the head 102 of the fastener 92 and an adjacent component of the assembly 80, such as either the mandrel 82 (FIG. 5) or the receiver 88 (FIG. 7).

Figure 8:
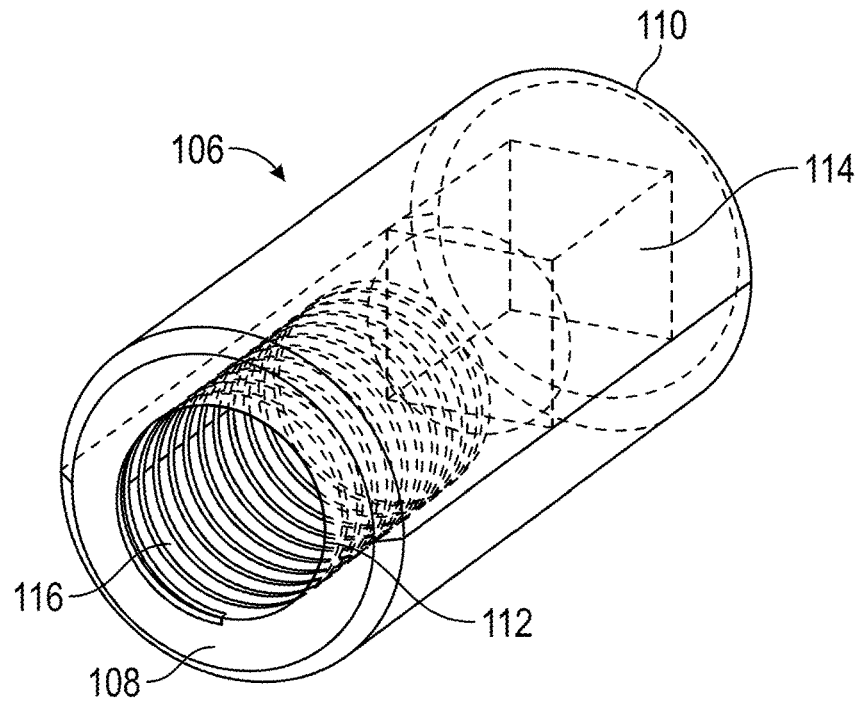
FIG. 8 is a perspective view of a socket attachment tool of the assembly for removing a portion of a bushing assembly of FIGS. 4-7 according to an embodiment of the invention.

A socket attachment 106, as shown in more detail in FIG. 8, is configured to extend through the hole 54 in the adjacent yoke mounting segment 50, 52 and engage the threaded portion 96 of the shaft 94. In one embodiment, the socket attachment 106 has a diameter equal to or smaller than the pin P. The socket attachment 106 includes a first interior hole 112 adjacent a first end 108 and a second interior hole 114 adjacent a second, opposite end 110. The size and shape of the first interior hole 112 and the second interior hole 114 are generally different. The first interior hole 112 includes a plurality of threads 116 generally complementary to the threaded portion 96 of shaft 94. The second interior hole 114 is configured to couple to a portion of a torque delivering tool (not shown), such as the post extending from a head of a socket wrench for example. As the socket attachment 106 rotates, the threaded engagement between the socket attachment 106 and the fastener 92 causes the head 102 of the fastener 92 to apply a force to and compress the biasing mechanism 104.

Figure 4:
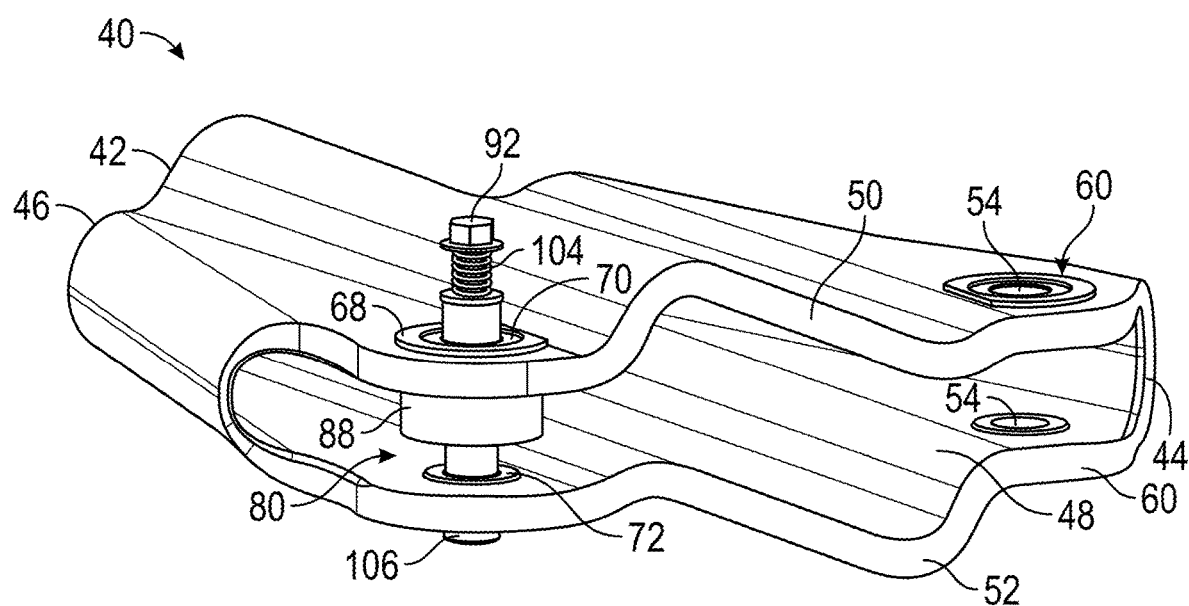
FIG. 4 is a perspective view of a yoke-receiving end of a composite cuff structure including an assembly for removing a portion of a bushing assembly according to an embodiment of the invention.
Figure 5:
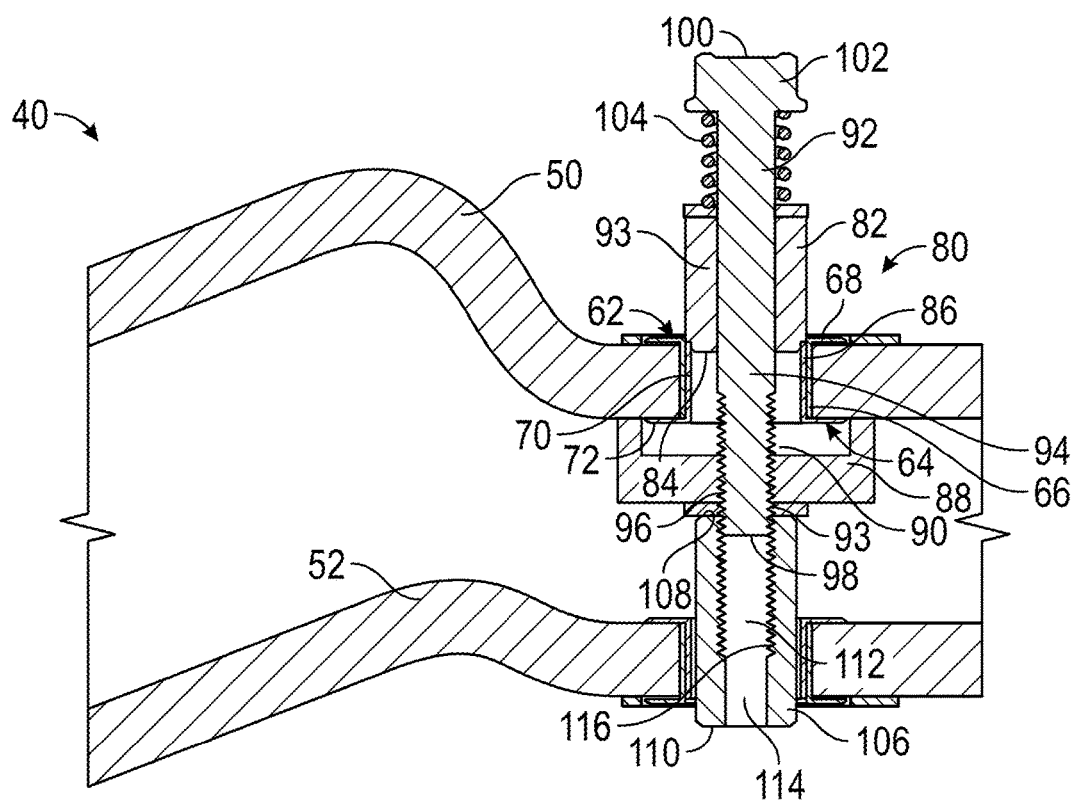
FIG. 5 is a cross-sectional view of a yoke-receiving end of a composite cuff structure including an assembly for removing a portion of a bushing assembly according to an embodiment of the invention.

With respect to the embodiment of FIGS. 4 and 5, the assembly 80 is configured to drive the second bushing 64 out of a press-fit engagement with the first bushing 62. The receiver 88 is adjacent flange 72 within an interior of the cuff structure 40, and the mandrel 82 is positioned outside the cuff structure 40, adjacent the cylindrical portion 70 of the bushing 64, opposite flange 72. The socket attachment 106 extends through the bushing assembly 60 arranged within hole 54 of yoke mounting segment 52 such that the first end of the socket attachment 106 is in direct or indirect contact, such as via a washer for example, with the receiver 88. The force applied by the socket attachment 106 on the receiver 88 limits movement of the receiver out of contact with yoke mounting segment 50.

The threaded portion 96 of the fastener shaft 94 is threadably coupled to the socket attachment 106. As the socket attachment 106 is rotated in a first direction, the threaded engagement between the socket attachment 106 and the fastener 92 increases. Because the socket attachment 106 is vertically "fixed" relative to yoke mounting segment 50, rotation thereof draws the shaft 94 of the fastener further into the first interior hole 112 such that a compressive force is applied to the biasing mechanism 104. The axial force from the biasing mechanism 104 transfers to the mandrel 82 which in turn drives the second bushing 64 toward the receiver 88 and out of engagement with the cylindrical portion 66 of the first bushing 62.

Figure 6:
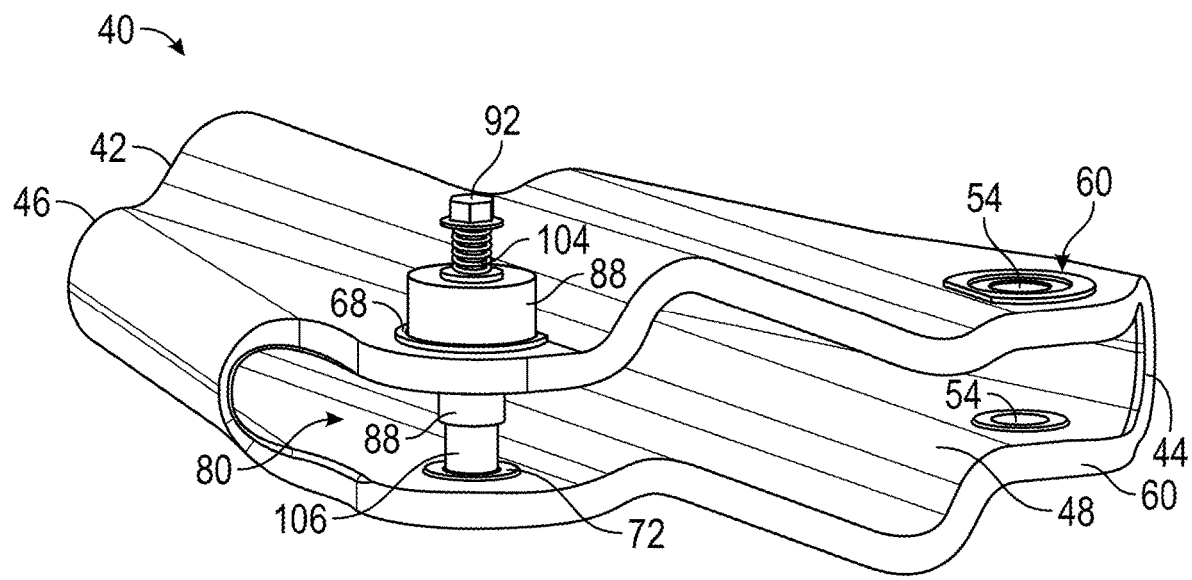
FIG. 6 is a perspective view of a yoke-receiving end of a composite cuff structure including an assembly for removing a portion of a bushing assembly according to an embodiment of the invention.
Figure 7:
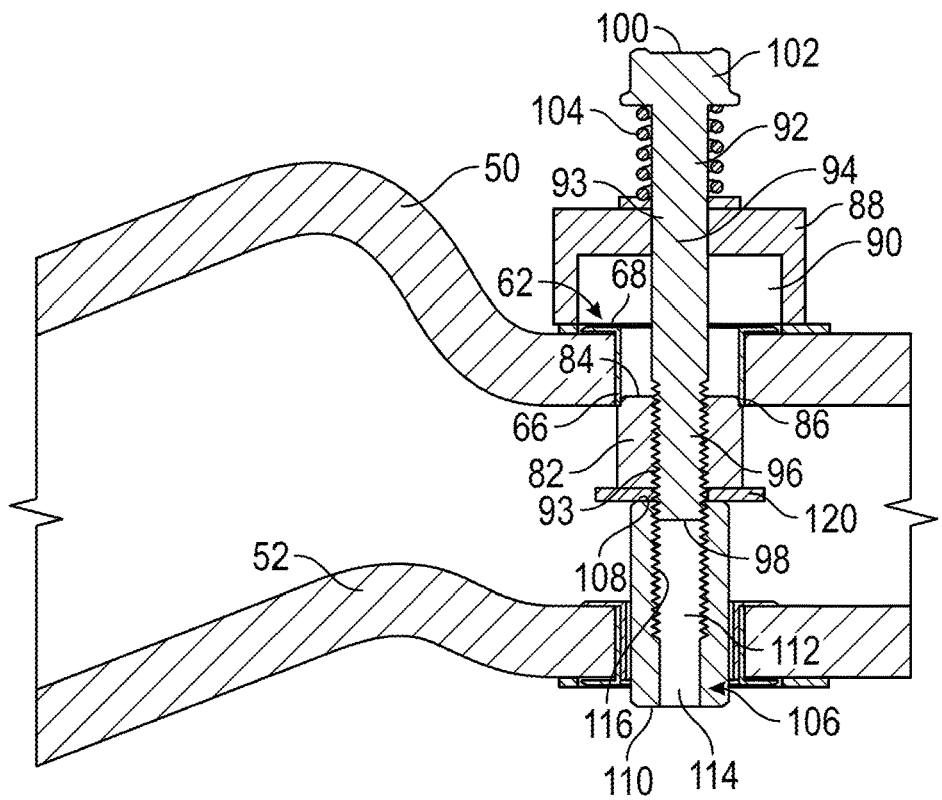
FIG. 7 is a cross-sectional view of a yoke-receiving end of a composite cuff structure including an assembly for removing a portion of a bushing assembly according to an embodiment of the invention.

FIGS. 6 and 7 illustrate use of the assembly 80 to remove the first bushing 62 after the second bushing 64 has been removed. In one embodiment, separate mandrels 82 may be used to remove the first bushing 62 and the second bushing 64. For instance, the mandrel 82 used to remove the first bushing 62 may have a slightly larger diameter than the mandrel 82 used to remove the second bushing 64. As shown in FIGS. 6 and 7, the receiver 88 is arranged at the exterior of the cuff structure 40 adjacent flange 68, and the mandrel 82 is arranged within the interior of the cuff structure 40, adjacent the cylindrical portion 66, opposite flange 68. The socket attachment 106 extends through the bushing assembly 60 arranged within hole 54 of yoke mounting segment 52 such that the first end 108 of the socket attachment 106 is in direct or indirect contact, such as via a washer 120 for example, with the mandrel 82.

In the illustrated, non-limiting embodiment, the threaded portion 96 of the fastener shaft 94 extends through the mandrel 82 and is threadably coupled to the socket attachment 106. As the socket attachment 106 is rotated in a first direction, the threaded engagement between the socket attachment 106 and the fastener 92 increases. As a result, the first end 108 of the socket attachment 106 drives the mandrel 82 vertically along an axis of the shaft 94 of the fastener 92, and into contact with the first bushing 62. In addition, the biasing mechanism 104 creates a reactionary force to the compression force applied thereto by the threaded engagement between the socket attachment 106 and the fastener 92. The reactionary force drives the fastener 92, and therefore the socket attachment 106 coupled thereto, vertically to displace the first bushing from the hole 54 of the yoke mounting segment 50.

The assembly 80 illustrated and described herein allows each of the bushings 62, 64 of the bushing assembly 60 to be removed from a corresponding hole 54 without damaging the composite cuff structure 40. The assembly 80 is adaptable such that the orientation of the assembly 80 and not the cuff 40 may be changed depending on which bushing 62, 64 is being removed. In addition, the socket attachment tool of the assembly 80 provides added benefit by allowing the operator to access the fastener 92 through the opposite yoke hole 54. As a result, the process of removing the bushings may be performed without heating the bushings, making it convenient for an operator in a hanger or in a field.

While not required, it is understood that aspects of the invention would allow press fitting of the bushing 62, 64 through reversal of the assembly 80 to apply the force to the shoulder 72. As such, the assembly 80, in aspects of the invention, can be used to both remove and install bushing 62, 64.

While the invention has been described in detail in connection with only a limited number of embodiments, it should be readily understood that the invention is not limited to such disclosed embodiments. Rather, the invention can be modified to incorporate any number of variations, alterations, substitutions or equivalent arrangements not heretofore described, but which are commensurate with the spirit and scope of the invention. By way of example, aspects can be used in other contexts for technologies using bushings, such as for automotive, maritime, wind turbines, industrial machinery, or other technologies where bushings are used. Additionally, while various embodiments of the invention have been described, it is to be understood that aspects of the invention may include only some of the described embodiments. Accordingly, the invention is not to be seen as limited by the foregoing description, but is only limited by the scope of the appended claims.

What is claimed is:
1. An assembly for removing a bushing, comprising:
   a mandrel having a size and shape similar to the bushing;
   a receiver having a hollow interior cavity;
   a fastener extending through an opening formed in both the mandrel and the receiver;

a socket attachment having a first opening configured to removably couple to a first end of the fastener and a second opening configured to removably couple to a torque delivery tool; and a biasing mechanism arranged adjacent a second end of the fastener, the biasing mechanism being configured to generate a biasing force to drive the mandrel against the bushing in response to a coupling of the socket attachment and the fastener.

2. The assembly according to claim 1, wherein the mandrel includes at least one chamfer configured to ensure proper engagement with a bushing.

3. The assembly according to claim 1, wherein the first end of the fastener includes a plurality of first threads and the first opening of the socket attachment includes a plurality of second threads, the plurality of second threads being complementary to the plurality of first threads.

4. The assembly according to claim 1, wherein the biasing mechanism comprises a coil spring.

5. The assembly according to claim 1, wherein the biasing mechanism is positioned between a portion of the fastener and the mandrel.

6. The assembly according to claim 1, wherein the biasing mechanism is positioned between a portion of the fastener and the receiver.

7. The socket attachment according to claim 1, wherein the torque delivery tool is a wrench.

8. The socket attachment according to claim 7, wherein the torque delivery tool is a socket wrench and the second opening is configured to receive a post extending from a head of the socket wrench.

9. The socket attachment according to claim 1, further comprising:

a mandrel arranged adjacent a bushing, the mandrel having a size and shape similar to the bushing;

a receiver having a hollow interior cavity;

a fastener extending through an opening formed in both the mandrel and the receiver, the socket attachment being coupled to a first end of the fastener; and a biasing mechanism arranged adjacent a second end of the fastener, the biasing mechanism being configured to generate a biasing force to drive the mandrel against the bushing in response to a coupling of the socket attachment and the fastener.

* * * * *